(12) United States Patent
Klim et al.

(10) Patent No.: US 11,518,417 B2
(45) Date of Patent: Dec. 6, 2022

(54) WHEELED VEHICLE STATION DOCKING USING A KNEELING LANDING GEAR SYSTEM

(71) Applicants: SAFRAN LANDING SYSTEMS, Velizy-Villacoublay (FR); SAFRAN LANDING SYSTEMS CANADA INC., Ajax (CA)

(72) Inventors: Graeme Peter Arthur Klim, Velizy-Villacoublay (FR); Andrew Michael Ellis, Guelph (CA); Justin Guang Yuang Cheng, Waterloo (CA)

(73) Assignees: SAFRAN LANDING SYSTEMS, Velizy Villacoublay (FR); SAFRAN LANDING SYSTEMS CANADA INC., Ajax (CA)

( * ) Notice: Subject to any disclaimer, the term of this patent is extended or adjusted under 35 U.S.C. 154(b) by 490 days.

(21) Appl. No.: 16/791,903

(22) Filed: Feb. 14, 2020

(65) Prior Publication Data
US 2021/0253137 A1    Aug. 19, 2021

(51) Int. Cl.
| B61B 1/02 | (2006.01) |
| B61B 1/00 | (2006.01) |
| B61B 13/10 | (2006.01) |
| B61B 13/12 | (2006.01) |
| B61F 13/00 | (2006.01) |

(52) U.S. Cl.
CPC ............... *B61B 1/02* (2013.01); *B61B 1/005* (2013.01); *B61B 13/10* (2013.01); *B61B 13/122* (2013.01); *B61F 13/00* (2013.01)

(58) Field of Classification Search
CPC B61B 1/02; B61B 1/005; B61B 13/10; B61B 13/122; B61F 13/00
See application file for complete search history.

(56) References Cited

U.S. PATENT DOCUMENTS

| 3,201,065 A | 8/1965 | Dunn |
| 7,000,560 B2 | 2/2006 | Wingett et al. |
| 10,493,859 B2 | 12/2019 | Zhou |
| 2016/0229416 A1* | 8/2016 | Bambrogan ............ B61L 27/04 |

(Continued)

FOREIGN PATENT DOCUMENTS

| CN | 101722954 B | 5/2013 |
| CN | 207389189 U | 5/2018 |

(Continued)

OTHER PUBLICATIONS

Goddard, S. The Hyperloop High Speed Transportation System, Module UFME6V-60-M, UWE Bristol, 62 pages. (Year: 2015).*

(Continued)

*Primary Examiner* — Russell Frejd
(74) *Attorney, Agent, or Firm* — Christensen O'Connor Johnson Kindness PLLC

(57) ABSTRACT

A method is disclosed for docking and undocking a hyperloop vehicle in a station. The method includes the step of extending a support system to a first position, wherein the support system engages a surface to support the hyperloop vehicle at a first elevation. The method further includes the steps of moving the hyperloop vehicle to a predetermined docking position and engaging a coupler to fixedly position the hyperloop vehicle relative to a docking platform.

19 Claims, 7 Drawing Sheets

(56) References Cited

U.S. PATENT DOCUMENTS

2016/0229646 A1\* 8/2016 Bambrogan .......... B61L 25/021
2016/0230350 A1\* 8/2016 Bambrogan ............ B61B 13/08
2017/0334312 A1 11/2017 Zhou
2018/0312245 A1 11/2018 Klim et al.
2019/0300301 A1\* 10/2019 Bambrogan ......... B23K 31/027

FOREIGN PATENT DOCUMENTS

| CN | 208559050 U | 3/2019 |
| DE | 23 38 728 A1 | 2/1975 |
| EP | 3 395 681 A1 | 10/2018 |
| GB | 2548098 A | 9/2017 |

OTHER PUBLICATIONS

International Search Report and Written Opinion dated May 11, 2021, issued in corresponding International Application No. PCT/IB2021/051032, filed Feb. 9, 2021, 14 pages.

\* cited by examiner

WHEELED VEHICLE STATION DOCKING USING A KNEELING LANDING GEAR SYSTEM

BACKGROUND

Hyperloop transportation systems provide the potential to move passengers and cargo at faster speeds and with improved efficiency compared to currently utilized modes of transportation. These systems employ vehicles that include one or more pressurized capsules to carry passengers and/or cargo through evacuated, i.e., low pressure, tubes. When traveling at high speeds, the vehicles are levitated by magnetic fields, compressed air, or other suitable means. By reducing/eliminating the high-speed air resistance and the friction inherent in the wheels of known vehicles, hyperloop systems are able to provide greater travel speeds and improved efficiency.

When traveling at low speeds or stopped, hyperloop vehicles do not levitate, but are instead supported by a wheeled support system. Like aircraft landing gear, the support system reciprocates between a retracted (stowed) position and an extended (deployed) position. When the vehicles are levitated, the support system is retracted, and the wheels do not contact the ground. When the vehicles are traveling at low speeds or stopped, the support system is extended so that the wheels of the support system contact a ground surface to support the vehicles.

Because the low-pressure environment required by a hyperloop vehicle is not suitable for passengers and some cargo, either (1) the hyperloop vehicle must be provided with an ambient pressure (pressurized) environment when loading or unloading, or (2) a passageway must be provided between the hyperloop vehicle and an ambient pressure area, i.e., an area outside of the evacuated docking station. Moving the hyperloop vehicle from to an ambient pressure area of the station and then returning the hyperloop vehicle to an evacuated area is inefficient. Similarly, pressurizing and then evacuating the docking station is also inefficient and time-consuming. Exemplary embodiments of docking station for hyperloop vehicles are disclosed in U.S. Pat. No. 10,493,859, which issued on Dec. 3, 2019, and is assigned to Hyperloop Transportation Technologies, Inc., the disclosure of which is incorporated herein in its entirety.

Providing a passageway is problematic because a rigid connection is required between the passageway and the hyperloop vehicle in order to prevent pressurized air in the passageway and the vehicle from venting into the docking station. However, because the hyperloop vehicle is a "sprung" mass, i.e., the interface between the hyperloop vehicle and the ground includes spring and damper elements, the hyperloop vehicle tends to rise and fall with changes to the overall mass of the hyperloop vehicle. Such changes in mass can occur due to passenger loading/off-loading, cargo loading/offloading, servicing various components of the hyperloop vehicle, or other events or combinations thereof.

SUMMARY

The subject matter disclosed herein provides a reliable method of docking and undocking a hyperloop vehicle that prevents uncommanded vehicle motion relative to the docking platform. This, in turn mitigates the potential that a sudden loss of sealing occurs between the pressurized interior of the passageway/hyperloop vehicle and the evacuated docking station environment.

A first representative embodiment of a method for docking and undocking a hyperloop vehicle in a station includes the step of extending a support system to a first position, wherein the support system engages a surface to support the hyperloop vehicle at a first elevation. The method further includes the steps of moving the hyperloop vehicle to a predetermined docking position and engaging a coupler to fixedly position the hyperloop vehicle relative to a docking platform.

In any embodiment, the step of moving the hyperloop vehicle to a predetermined docking position includes retracting the support system to a second position to lower the vehicle to a second elevation.

In any embodiment, the step of moving the hyperloop vehicle to a predetermined docking position further includes sensing an elevation of the hyperloop vehicle and comparing the sensed position to the predetermined docking position.

In any embodiment, the method further includes the step of retracting the support system to a third position after the hyperloop vehicle is fixedly positioned relative to the docking platform so that the support system does not support the hyperloop vehicle.

In any embodiment, the method further includes the step of extending a walkway towards the vehicle.

In any embodiment, the method further includes the step of sealingly coupling the walkway to the vehicle so that an interior portion of the walkway is in fluid communication with an interior portion of the hyperloop vehicle.

In any embodiment, the method further includes the step of disengaging the walkway from the vehicle.

In any embodiment, the method further includes the step of extending the support system to the second position.

In any embodiment, the method further includes the step of disengaging the coupler.

In any embodiment, the method further includes the step of extending the support system to the first position.

A second representative embodiment of a method of docking and undocking a hyperloop vehicle includes the steps of moving a hyperloop vehicle in a first tube towards a docking station and deploying a support system to a first position, the support system engaging a surface to support the vehicle at a first elevation. The method further includes the steps of taxiing the hyperloop vehicle into the docking station and moving the hyperloop vehicle to a predetermined docking position. The support system is retracted to a second position to lower the hyperloop vehicle to a second elevation, and the hyperloop vehicle is fixedly positioned relative to a fixed portion of the docking station.

In any embodiment, the step of moving the hyperloop vehicle to a predetermined docking position includes lowering the hyperloop vehicle to a second elevation.

In any embodiment, the step of moving the hyperloop vehicle to a predetermined docking position further includes sensing an elevation of the hyperloop vehicle and comparing the sensed position to a predetermined docking position.

In any embodiment, the method further includes the step of retracting the support system after the hyperloop vehicle is rigidly positioned relative to the docking platform.

In any embodiment, the method further includes the steps of extending a walkway toward the hyperloop vehicle and sealingly coupling the walkway to the hyperloop vehicle so that an interior portion of the walkway is in fluid communication with an interior portion of the hyperloop vehicle.

In any embodiment, the method further includes the step of disengaging the walkway from the hyperloop vehicle.

In any embodiment, the method further includes the step of extending the support system to at least partially support the hyperloop vehicle.

In any embodiment, the method further includes the step of releasing the hyperloop vehicle from being fixedly positioned relative to the fixed portion of the docking station.

In any embodiment, the method further includes the steps of extending the support system to raise the hyperloop vehicle to the first elevation and taxiing the hyperloop vehicle out of the docking station.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of methods and configurations for docking and undocking a hyperloop vehicle are set forth below according to technologies and methodologies of the present disclosure. In an exemplary embodiment, a method for docking and undocking a hyperloop vehicle in a station includes the step of extending a support system to a first position, wherein the support system engages a surface to support the hyperloop vehicle at a first elevation. The method further includes the steps of moving the hyperloop vehicle to a predetermined docking position and engaging a coupler to fixedly position the hyperloop vehicle relative to a docking platform.

Figure 1:
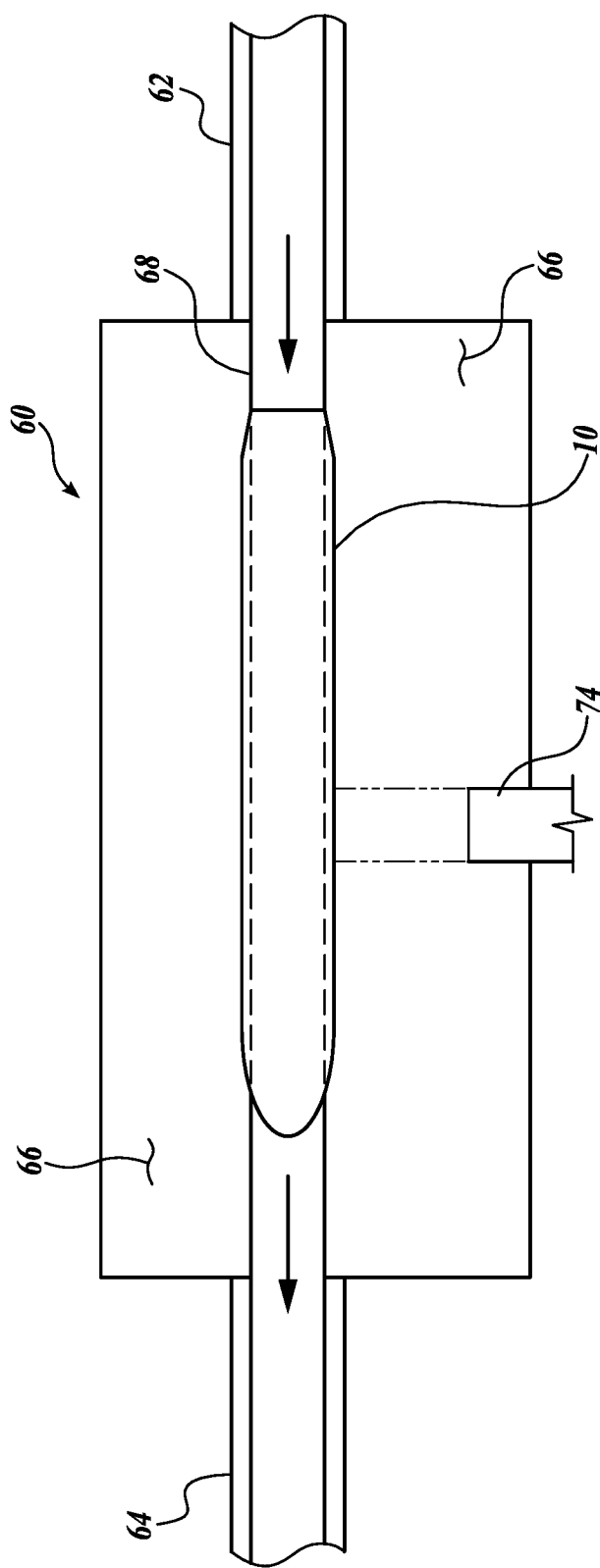
FIG. 1 shows a schematic plan view of a docking station for a hyperloop vehicle according to the present disclosure.

Referring now to FIG. 1, a representative embodiment of a docking station 60 for a hyperloop vehicle 10 according to the present disclosure is shown. An entrance tube 62 is in fluid communication with a first end of the docking station 60, and an exit tube 64 is in fluid communication with a second end of the docking station 60. The tubes 62 and 64 and the interior of the docking station 60 are evacuated and maintained at low air pressure.

Figure 2:
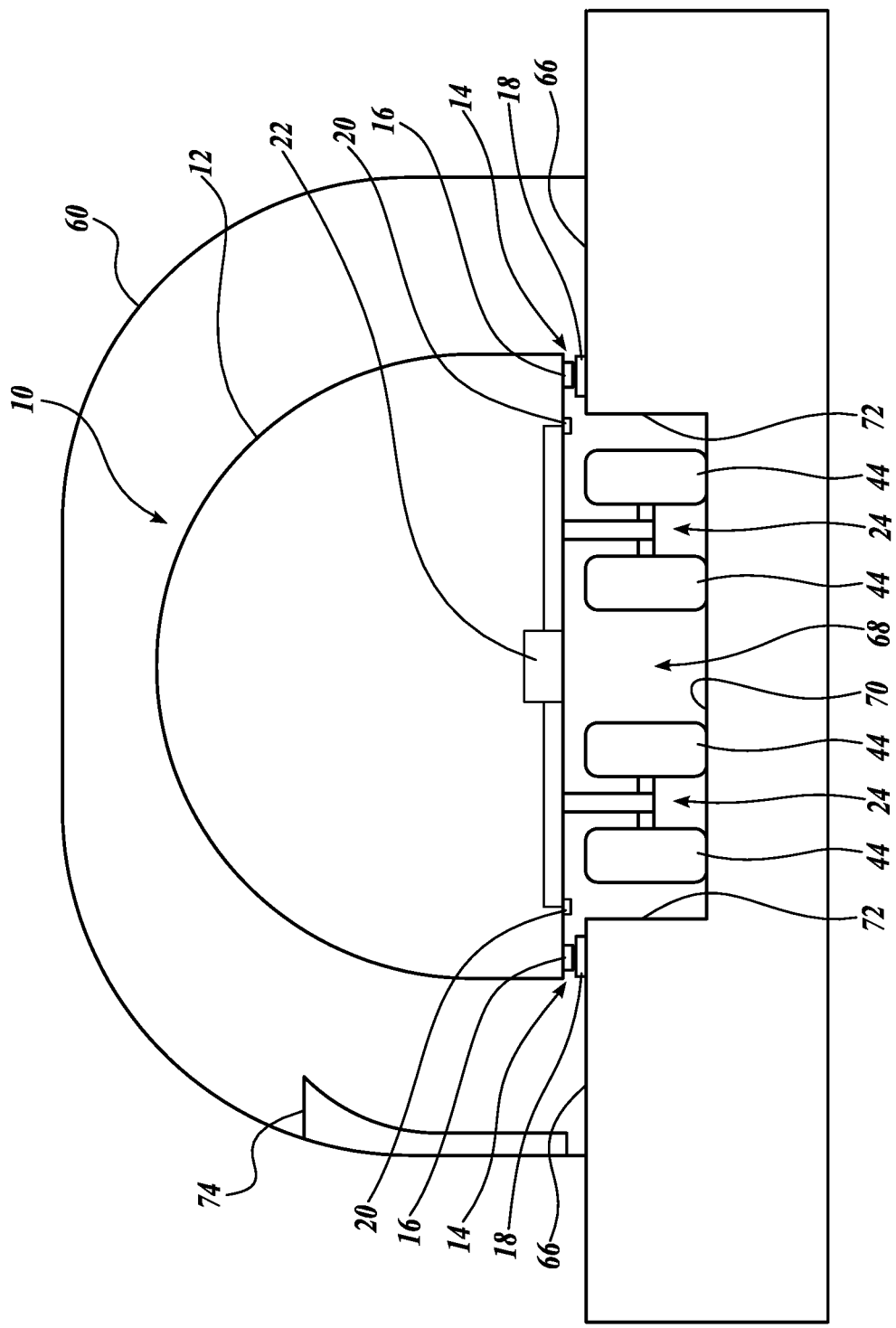
FIG. 2 shows a schematic end view of the hyperloop vehicle shown in FIG. 1, wherein the hyperloop vehicle is in a first docking state.
Figure 3:
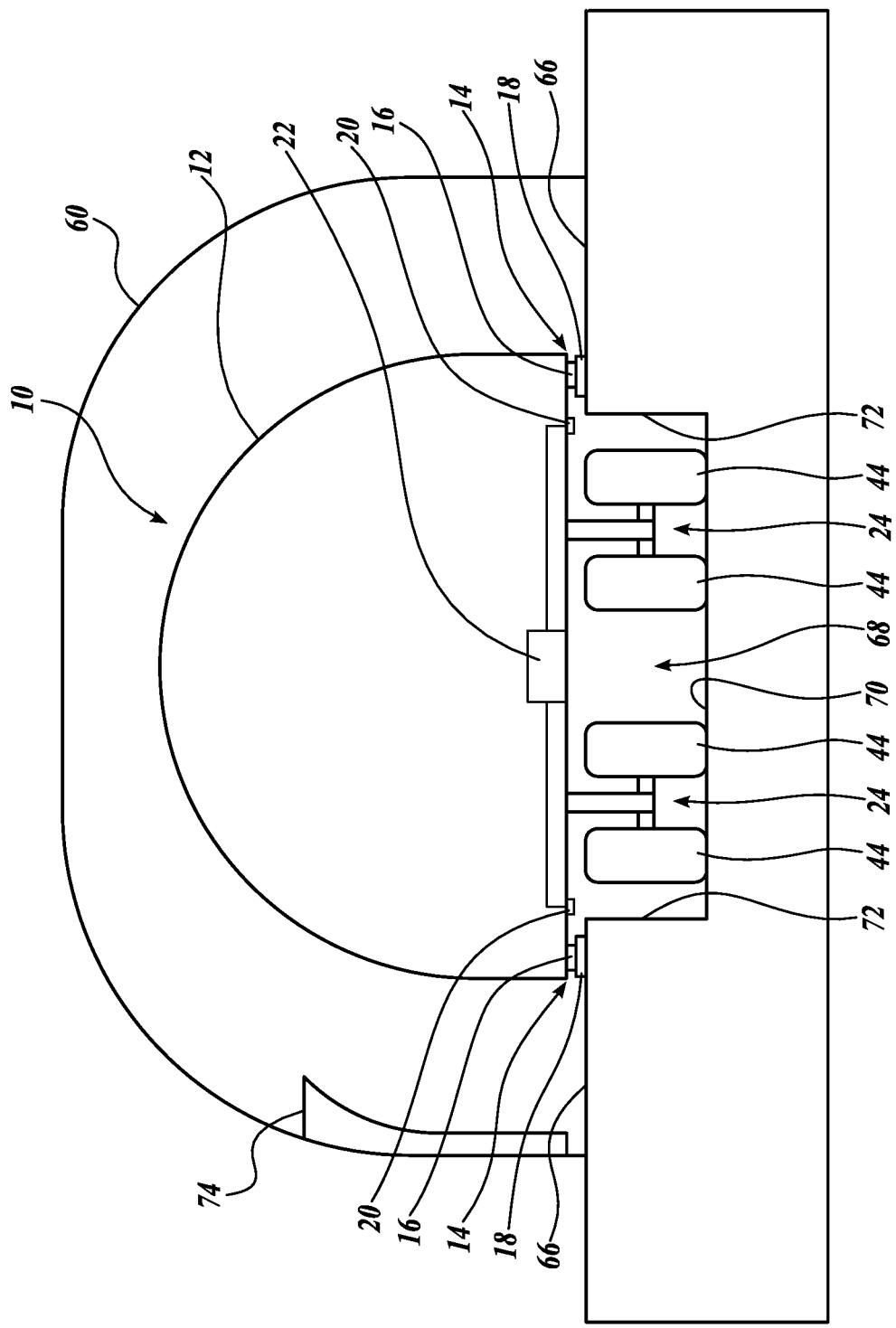
FIG. 3 shows a schematic end view of the hyperloop vehicle shown in FIG. 1, wherein the hyperloop vehicle is in a second docking state.
Figure 4:
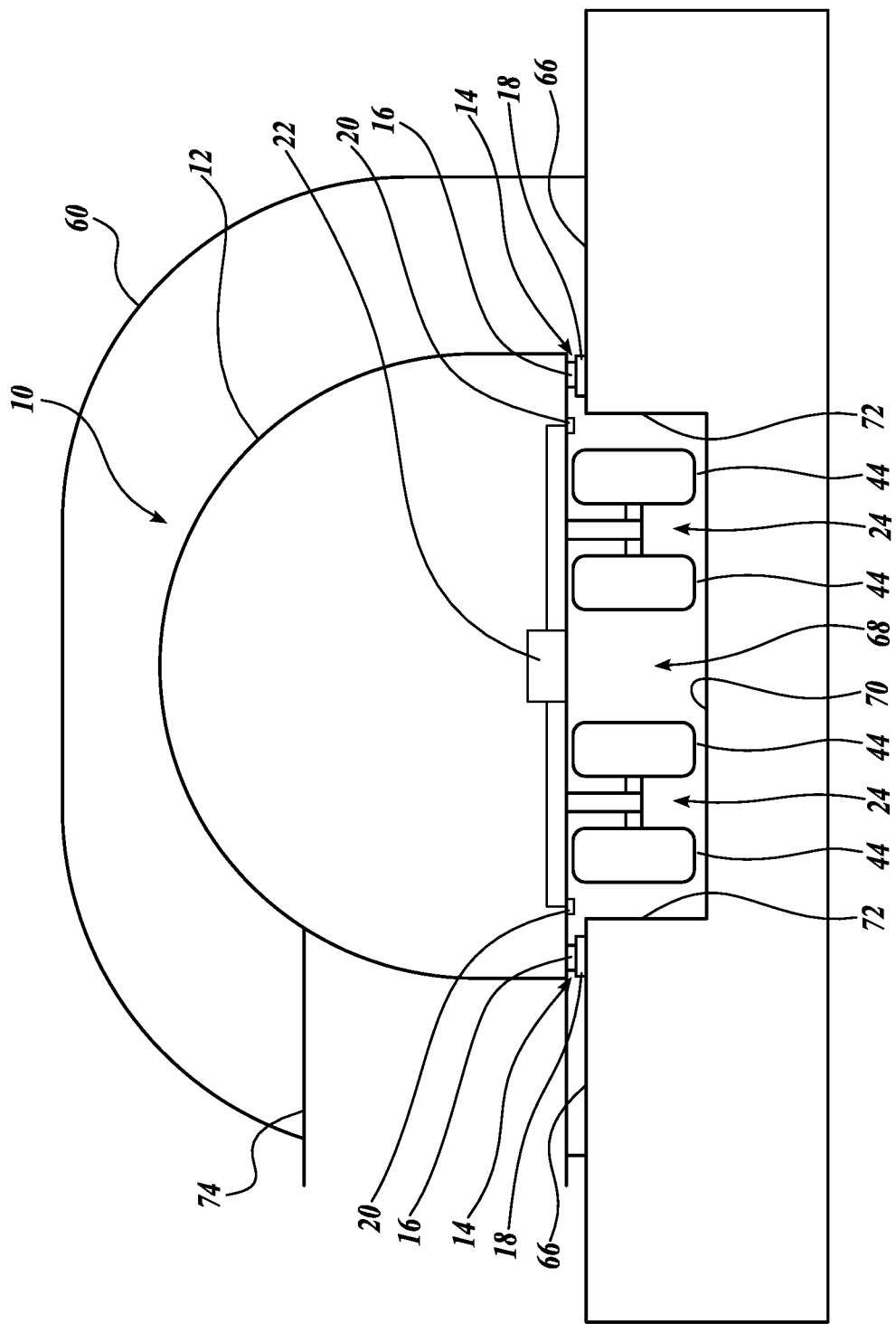
FIG. 4 shows a schematic end view of the hyperloop vehicle shown in FIG. 1, wherein the hyperloop vehicle is in a third docking state.

A guide channel 68 extends along the floor of the station from the entrance tube 62 to the exit tube 64 and separates docking platforms 66 positioned on opposite sides of the station 60. As best shown in FIGS. 2-4, the channel 68 includes a base portion 70 and sidewalls 72 extending vertically up from the base 70 to the docking platforms 66. When the hyperloop vehicle 10 is at the docking station 60, a support system 24, e.g., landing gear, is extended so that wheels 44 contact the base portion 70 of the channel 68 to support the hyperloop vehicle. At the same time, the support system 24 is at least partially disposed between the sidewalls 72 of the channel 68 so that the sidewalls guide the support system and the hyperloop vehicle 10 as the hyperloop vehicle taxis through the docking station 60. Taxiing may be enabled by one or more motor-driven wheels within the support system 24, by external vehicle level systems, or by any other configuration suitable for driving the hyperloop vehicle 10 when at least partially supported by the support system 24.

Figure 5:
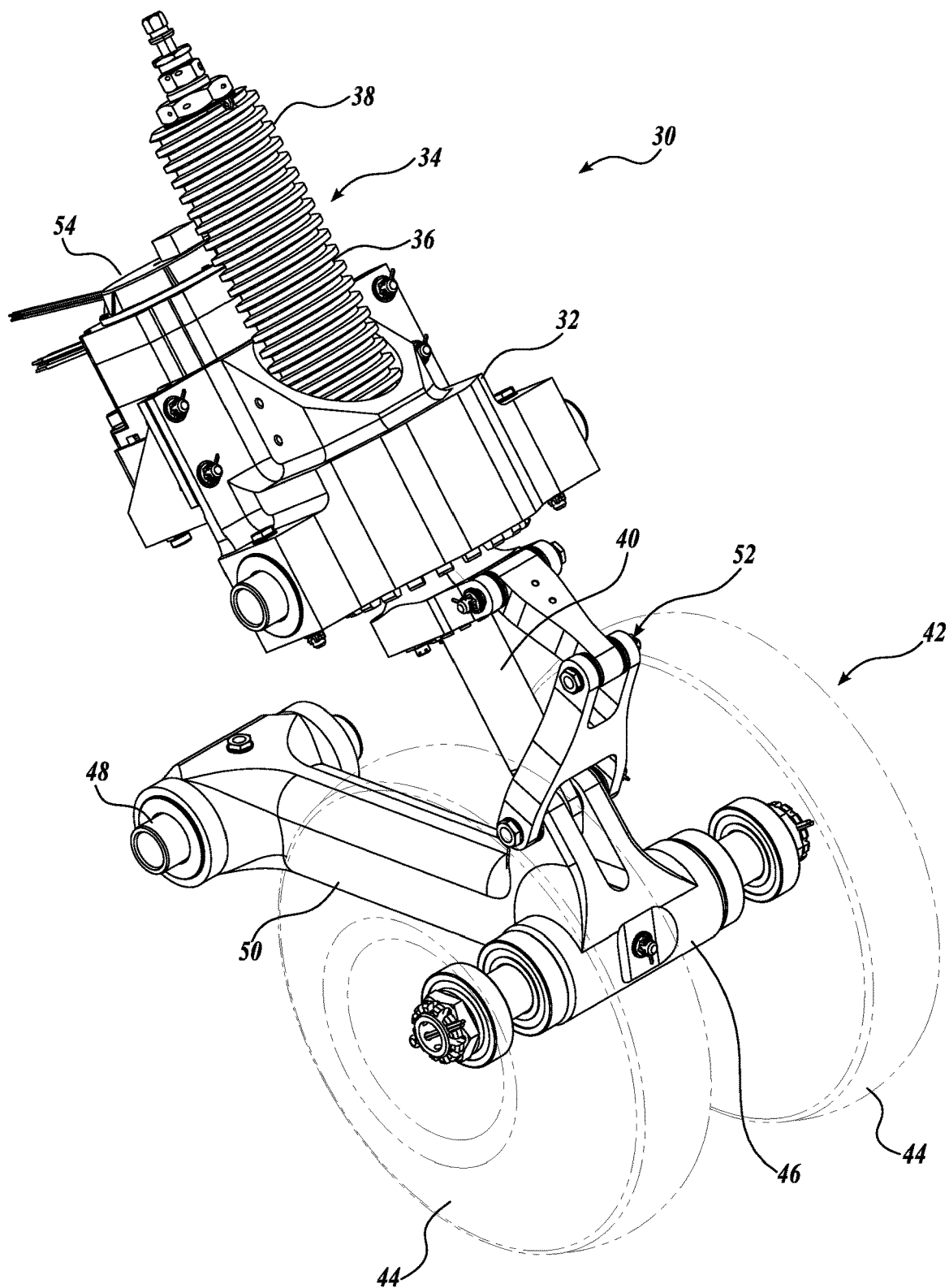
FIG. 5 shows an isometric view of a known embodiment of a deployable and retractable shock absorbing strut suitable for use as part of a support system for a disclosed hyperloop vehicle.

In the illustrated embodiment, the support system 24 includes a plurality of struts 30. FIG. 5 shows an embodiment of a deployable and retractable shock absorbing strut 30 suitable for use as part of a support system for a hyperloop vehicle. The strut 30 is disclosed in U.S. Patent Application Publication 2018/0312245 ("Klim et al."), filed Apr. 26, 2017, and currently assigned to Safran Landing Systems Canada Inc., the disclosure of which is expressly incorporated herein. The strut 30 includes a housing 32 configured to be pivotably mounted to a vehicle (not shown), such as an aircraft or a hyperloop vehicle. A shock absorber 34 extends through an aperture in the housing 32 and includes a cylinder 36 and a piston 40 slidingly engaged with the cylinder. The piston 40 is pivotally connected to a ground engaging assembly 42 that includes a pair of wheels 44 rotatably mounted to an axle 46 positioned at one end of a trailing arm body 50. A pivot pin 48 is positioned at the other end of the trailing arm body 50 and rotatably couples the trailing arm body to the vehicle. A torsion link assembly 52 maintains the rotational position of the trailing arm body 50 relative to the housing 32 about the longitudinal axis of the piston 40.

The cylinder 36 includes an external screw thread 38 that engages an internal screw thread formed in the aperture of the housing 32. A motor 54 is fixed to the housing 32 and is configured to selectively rotate the cylinder 36 to move the ground engaging assembly 42 axially with respect to the housing. That is, by rotating the cylinder 36 in first and second directions, the shock absorber axially reciprocates the ground engaging assembly 42 between an extended (deployed) position, a retracted (stowed) position, or any position in between.

It will be appreciated that the disclosed strut is exemplary only, and various alternate embodiments are possible for use with the support system for a hyperloop vehicle. In an embodiment, the strut includes braking wheels, driven wheels, or both to decelerate the vehicle (using brakes and/or wheel drives) and/or to accelerate the vehicle (using wheel drive). In other embodiments, the extension and retraction of the strut is driven by an electric actuator, a hydraulic actuator, a pneumatic actuator, or any other suitable actuator or combination of actuators.

It will further be appreciated that the support system 24 is not limited to a particular configuration. Nonlimiting examples of alternate embodiments include support systems with different numbers of wheels, struts, wheel locations, extension/retraction mechanisms, and combinations thereof. In this regard, any suitable support system that selectively moves between a first position, in which the hyperloop vehicle is supported on wheels, and a second position, in which the support system does not support the hyperloop vehicle, may be utilized and should be considered within the scope of the present disclosure.

Referring back to FIG. 1, the docking station 60 includes one or more walkways 74 located along the walls of the docking station 60. To couple the walkway 74 to the hyperloop vehicle 10, the walkway first extends from the wall until it contacts the hyperloop vehicle. The walkway 74 attaches to the hyperloop vehicle 10 to form an airtight seal therebetween. With the walkway 74 sealed to the hyperloop vehicle 10, the walkway is pressurized, and a vehicle door corresponding to the end of the walkway is opened, thereby providing a pressurized pathway through the evacuated docking station 60 to and from the interior of the hyperloop vehicle.

In operation, the hyperloop vehicle 10 travels toward the docking station 60 through entrance tube 62. The hyperloop vehicle 10 is traveling at a high speed and is levitated in the tube 62 with the support system 24 retracted so that the wheels 44 (FIG. 1) are not in contact with any portion of the tube 62. As the hyperloop vehicle 10 approaches the docking station 60 the speed decreases, and the support system 24 extends down to a first extended position, in which the support system contacts the base portion 70 of the channel 68 (or of a portion of the tube 62) to support the hyperloop vehicle 10 at a first elevation. When supported at the first elevation, the hyperloop vehicle 10 is positioned above the platforms 66. As the hyperloop vehicle 10 moves through the docking station 60, the sidewalls 72 of the channel 68 guide the support system 24 and, therefore, the hyperloop vehicle.

Referring now to FIG. 2, one or more sensors 20 are positioned on the hyperloop vehicle 10 and are operably coupled to a control circuit or controller 22. The sensors 20 sense the position of the hyperloop vehicle 10 within the docking station 60 and transmit corresponding signals to the controller 22. It will be appreciated that the illustrated sensor configuration is exemplary only and should not be considered limiting. In this regard, the sensors may be proximity sensors, i.e., sensors that sense the position of an object without making physical contact, such as optical sensors, inductive sensors, capacitive sensors, etc. Other embodiments include contact sensors, or any other sensor or group of sensors configured to sense the position of the hyperloop vehicle 10. It will further be appreciated that the number and location of sensors may vary, and such variations should be considered within the scope of the present disclosure.

The controller 22 receives signals from the sensors 20 and is programmed to determine if the position of the hyperloop vehicle 10 corresponds to a predetermined docking position. In an embodiment, the controller controls a drive system of the hyperloop vehicle 10 to stop the hyperloop vehicle from moving forward when the hyperloop vehicle reaches the predetermined docking position. In another embodiment, the controller is programmed to activate a signal to signal an operator that the hyperloop vehicle has reached the predetermined docking position.

A coupler 14 includes a first portion 16 attached to the hyperloop vehicle 10. More specifically, the first portion 16 is attached to a portion of the hyperloop vehicle 10 that is to remain in a fixed position relative to the docking platform 66 when the hyperloop vehicle is docked. In one embodiment, the first portion 16 of the coupler 14 is attached to the capsule 12 of the hyperloop vehicle. The coupler 14 further includes a second portion 18 attached to the platform 66 or another fixed portion of the docking station 60. In one embodiment, the second portion 18 is attached to a sidewall 72 or the base 68 of the channel 68. In another embodiment, the second portion 18 is attached to any suitable structure that maintains a fixed position relative to the platform 66.

With the support system 24 in the first extended position to maintain the hyperloop vehicle 10 at the first elevation, the first and second portions 16 and 18 of the coupler 14 are disengaged from each other, and the hyperloop vehicle moves forward until the position of the hyperloop vehicle corresponds to a predetermined docking position. When the controller 22 receives a signal from the sensor(s) 20 that the hyperloop vehicle 10 is in the predetermined docking position, the controller controls the drive system of the hyperloop vehicle to prevent further forward motion.

FIG. 3 shows the hyperloop vehicle 10 at a second elevation, rigidly positioned relative to the platform 66 of the docking station 60 by a plurality of couplers 14. After the hyperloop vehicle 10 reaches the predetermined docking position of FIG. 2, the support system 24 retracts to a second position so that the hyperloop vehicle is lowered to a second elevation. In one embodiment, movement of the hyperloop vehicle 10 from the first elevation to the second elevation engages the first portion 16 of each coupler 14 with the second portion 18 of the corresponding coupler to rigidly position the hyperloop vehicle relative to the platform 66 of the docking station 60. In another embodiment, the support system 24 moves the hyperloop vehicle 10 to the second elevation, and then the first portion 16 of each coupler 14 engages the corresponding second portion 18 of the coupler to rigidly position the hyperloop vehicle relative to the platform 66 of the docking station 60.

With the hyperloop vehicle 10 positioned at the second elevation and the coupler rigidly positioning the hyperloop vehicle relative to the platform 66 of the docking station 60, the support system 24 retracts further to a third position shown in FIG. 4. In the third position, the support system 24 has retracted so that the wheels 44 of the support system are no longer in contact with the base 70 of the channel 68. As a result, the weight of the hyperloop vehicle 10 is fully supported by the couplers 14 and not by the support system 24. The walkway 74 extends to the hyperloop vehicle 10 and forms a sealed connection with an outer surface of the hyperloop capsule 12.

Because the hyperloop vehicle 10 is rigidly supported by the couplers 14 instead of the support system 24, the hyperloop vehicle is not a sprung load. Thus, the elevation of the hyperloop vehicle 10 does not change in reaction to changes to the mass of the hyperloop vehicle, as is the case when the hyperloop vehicle is supported by the support system 24. In addition to preventing undesired motion due to loading and unloading, the couplers 14 also ensure that undesired vehicle loading and/or motion will not occur due to a malfunction of the landing gear or other associated components when the hyperloop vehicle 10 is docked. By preventing unwanted movement of the docked hyperloop vehicle 10 relative to the platform 66, the disclosed system mitigates the risk that the seal between the walkway 74 and the hyperloop vehicle is unintentionally disrupted, thereby preventing unwanted and potentially dangerous depressurization of the walkway and hyperloop vehicle.

To undock the hyperloop vehicle 10, the docking procedure is reversed. First, walkway 72 is disengaged from the hyperloop vehicle 10 and returned to the retracted position. The support system 24 is then lowered to the second position, shown in FIG. 3, so that the wheels 44 contact the base 70 of the channel 68, and at least a portion of the weight of the hyperloop vehicle 10 is supported by the support system 30. The couplers 14 are then uncoupled, i.e., the first portion 16 of each coupler disengages with the corresponding second portion 18 the coupler. Next, the support system 24 extends to the first position, thereby raising the hyperloop vehicle 10 to the first elevation shown in FIG. 2. With the support system 24 in the first position, the hyperloop vehicle 10 is fully supported by the support system.

The hyperloop vehicle 10, now supported by the support system 24, moves along the channel 68 toward the exit tube 64 shown in FIG. 1. The hyperloop vehicle 10 moves into the exit tube 64 and accelerates to a cruising speed. As the hyperloop vehicle 10 accelerates, the hyperloop vehicle begins to levitate, and the support system 24 retracts to a stowed position.

Figure 6:
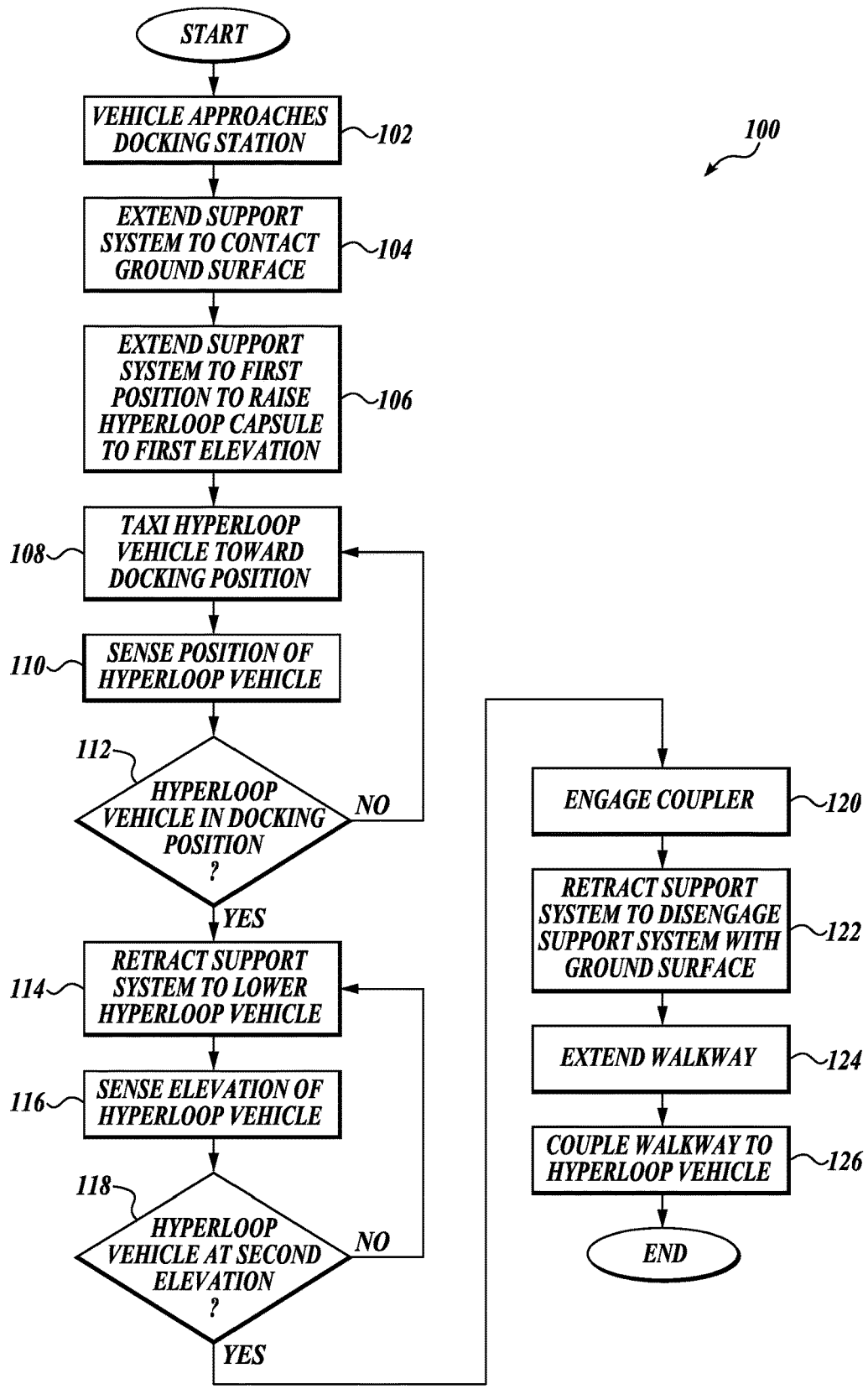
FIG. 6 shows a flow chart of a representative embodiment of a method for docking a hyperloop vehicle according to the present disclosure.

FIG. 6 shows a representative embodiment of a method 100 for docking a hyperloop vehicle 10 in a docking station according to the present disclosure. The method 100 starts by proceeding to block 102, in which the hyperloop vehicle 10 approaches the docking station 60. The method then proceeds to block 104, wherein the support system 24 of the vehicle 10 is deployed to contact a ground surface. In block 106, the support system 24 extends to a first position. When the support system 24 is in the first position, the hyperloop vehicle 10 is raised to a first elevation.

The method 100 proceeds to block 108, in which the hyperloop vehicle 10 taxis toward a docking position. In block 110, the position of the hyperloop vehicle 10 is sensed, and in block 112, a controller 22 compares the sensed position to the docking position. If the hyperloop vehicle 10 has not reached the docking position, the method returns to block 108, and the hyperloop vehicle continues to taxi toward the predetermined docking position. If it is determined in block 112 that the hyperloop vehicle 10 has reached the docking position, the method 100 proceeds to block 114.

In block 114, the support system 24 is retracted to lower the hyperloop vehicle 10. The method proceeds to block 116 in which the elevation of the hyperloop vehicle 10 is sensed. In block 118, the sensed elevation is compared to a predetermined second elevation. If the hyperloop vehicle 10 has not reached the second elevation, the method 100 returns to block 114, and the support system 24 continues to retract. If the hyperloop vehicle 10 has reached the second elevation, then the method 100 proceeds to block 120.

In block 120, the coupler 14 is engaged to fixedly position the hyperloop vehicle 10 relative to a docking platform 66. The method 100 then proceeds to block 122, in which the support system 30 is further retracted to disengage the wheels 44 of the support system from the ground surface.

In block 124, the walkway 74 in the docking station is extended to the hyperloop vehicle 10. Then, in block 126, the walkway 74 couples to the hyperloop vehicle 10. The walkway 74 is coupled to the hyperloop vehicle 10 such that the walkway sealingly engages the hyperloop vehicle to provide a pressurized passage to and from the pressurized interior of the hyperloop vehicle.

Figure 7:
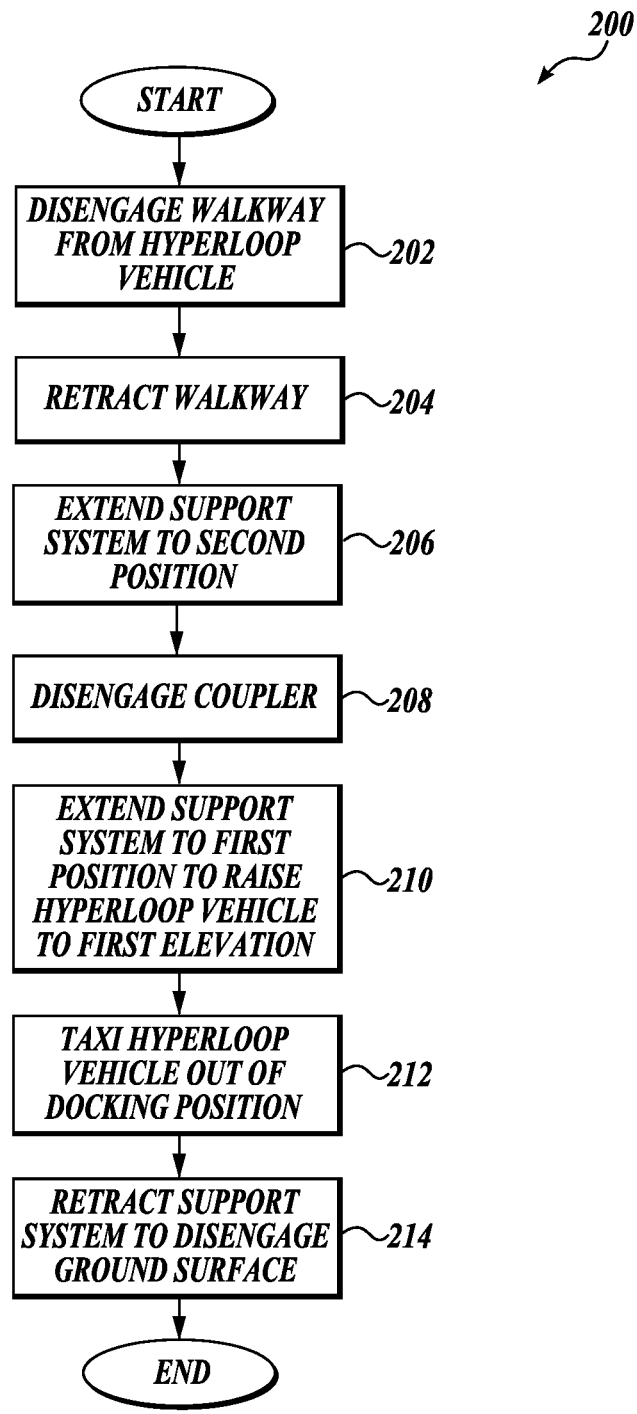
FIG. 7 shows a flow chart of a representative embodiment of a method for undocking a hyperloop vehicle according to the present disclosure

FIG. 7 shows a representative embodiment of a method 200 for undocking a hyperloop vehicle 10 that has docked in docking station 60 according to the method 100 shown in FIG. 6. The method 200 starts by proceeding to block 202, in which the walkway 74 is disengaged from the hyperloop vehicle 10. In block 204, the walkway 74 is retracted.

The method 200 proceeds to block 206, wherein the support system 24 is extended to the second position. In the second position, support system 24 contacts the ground surface and at least partially supports the hyperloop vehicle 10. In block 208, the coupler 14 is disengaged so that the hyperloop vehicle 10 is no longer rigidly positioned relative to the docking platform 66, but is instead supported by the support system 24.

The method 200 then proceeds to block 210, wherein the support system 24 extends to the first position to raise the hyperloop vehicle 10 to the first elevation. At block 212, the hyperloop vehicle 10 taxis out if the docking position toward the exit tube 64. Finally, at block 214, the support system 24 is retracted to disengage the ground surface, at which point the hyperloop vehicle 10 is levitated, and the method 200 ends.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A method of docking and undocking a hyperloop vehicle, comprising the steps of:
    extending a support system to a first position, the support system engaging a surface to support the hyperloop vehicle at a first elevation;
    moving the hyperloop vehicle to a predetermined docking position; and
    engaging a coupler to fixedly position the hyperloop vehicle relative to a docking platform.

2. The method of claim 1, wherein the step of moving the hyperloop vehicle to a predetermined docking position includes retracting the support system to a second position to lower the vehicle to a second elevation.

3. The method of claim 2, wherein the step of moving the hyperloop vehicle to the predetermined docking position further includes sensing an elevation of the hyperloop vehicle and comparing the sensed position to the predetermined docking position.

4. The method of claim 2, further comprising the step of retracting the support system to a third position after the hyperloop vehicle is fixedly positioned relative to a docking platform so that the support system does not support the hyperloop vehicle.

5. The method of claim 4, further comprising the step of extending the support system to the second position.

6. The method of claim 5, further comprising the step of disengaging the coupler.

7. The method of claim 6, further comprising the step of extending the support system to the first position.

8. The method of claim 1, further comprising the step of extending a walkway towards the vehicle.

9. The method of claim 8, further comprising the step of sealingly coupling the walkway to the vehicle so that an interior portion of the walkway is in fluid communication with an interior portion of the hyperloop vehicle.

10. The method of claim 9, further comprising the step of disengaging the walkway from the vehicle.

11. A method of docking and undocking a hyperloop vehicle, comprising the steps of:
    moving a hyperloop vehicle in a first tube towards a docking station;
    deploying a support system to a first position, the support system engaging a surface to support the vehicle at a first elevation;
    taxiing the hyperloop vehicle into the docking station;
    moving the hyperloop vehicle to a predetermined docking position;
    retracting the support system to a second position to lower the hyperloop vehicle to a second elevation; and
    fixedly positioning the hyperloop vehicle relative to a fixed portion of the docking station.

12. The method of claim 11, wherein the step of moving the hyperloop vehicle to a predetermined docking position includes lowering the hyperloop vehicle to a second elevation.

13. The method of claim 12, wherein the step of moving the hyperloop vehicle to a predetermined docking position further includes sensing an elevation of the hyperloop vehicle and comparing the sensed position to a predetermined docking position.

14. The method of claim 11, further comprising the step of retracting the support system after the hyperloop vehicle is rigidly positioned relative to the docking platform.

15. The method of claim 14, further comprising the step of extending the support system to at least partially support the hyperloop vehicle.

16. The method of claim 15, further comprising the step of releasing the hyperloop vehicle from being fixedly positioned relative to the fixed portion of the docking station.

17. The method of claim 16, further comprising the steps of:
    extending the support system to raise the hyperloop vehicle to the first elevation; and
    taxiing the hyperloop vehicle out the docking station.

18. The method of claim 11, further comprising the steps of:
    extending a walkway toward the hyperloop vehicle; and
    sealingly coupling the walkway to the hyperloop vehicle so that an interior portion of the walkway is in fluid communication with an interior portion of the hyperloop vehicle.

19. The method of claim 18, further comprising the step of disengaging the walkway from the hyperloop vehicle.

* * * * *